United States Patent
Wang et al.

(10) Patent No.: US 6,828,387 B2
(45) Date of Patent: Dec. 7, 2004

(54) POLYISOPRENE ARTICLES AND PROCESS FOR MAKING THE SAME

(75) Inventors: Shiping Wang, Libertyville, IL (US); Yun-Siung Tony Yeh, Libertyville, IL (US); Randell Wenig, Batavia, IL (US); Wong Weicheong, Kedah (MY)

(73) Assignee: Allegiance Corporation, McGaw Park, IL (US)

( * ) Notice: Subject to any disclaimer, the term of this patent is extended or adjusted under 35 U.S.C. 154(b) by 218 days.

(21) Appl. No.: 10/096,226

(22) Filed: Mar. 12, 2002

(65) Prior Publication Data

US 2002/0173563 A1 Nov. 21, 2002

Related U.S. Application Data

(60) Provisional application No. 60/275,087, filed on Mar. 12, 2001.

(51) Int. Cl.$^7$ .................................................. C08L 9/02
(52) U.S. Cl. ................. 525/324.3; 525/326.1; 524/25; 524/399; 524/565; 428/36.8
(58) Field of Search .......................... 525/329.3, 326.1; 428/36.8; 524/565, 399, 25, 571

(56) References Cited

U.S. PATENT DOCUMENTS

| | | | |
|---|---|---|---|
| 3,234,166 A | | 2/1966 | Hecker ...................... 260/29.7 |
| 3,725,328 A | * | 4/1973 | Bowell et al. ............... 524/560 |
| 5,023,301 A | * | 6/1991 | Burlett et al. ................ 525/232 |
| 5,026,807 A | | 6/1991 | Ohira et al. ................. 526/321 |
| 5,357,636 A | | 10/1994 | Dresdner et al. ............. 2/161.7 |
| 5,744,552 A | | 4/1998 | D'Sidocky et al. ....... 525/332.6 |
| 6,013,737 A | * | 1/2000 | Takagishi et al. ......... 525/332.7 |
| 6,187,857 B1 | * | 2/2001 | Ozawa et al. ................ 524/565 |
| 6,329,444 B1 | * | 12/2001 | McGlothlin et al. ......... 523/105 |
| 6,582,788 B2 | * | 6/2003 | Yeh ............................ 428/36.8 |

* cited by examiner

*Primary Examiner*—David Wu
*Assistant Examiner*—Henry S. Hu
(74) *Attorney, Agent, or Firm*—Andrew G. Rozycki

(57) ABSTRACT

The invention disclosed herein relates to an improved process for making elastomeric polyisoprene articles. In particular, the process of the invention is a system which produces synthetic polyisoprene articles exhibiting tensile strength properties similar to that of solvent-based processes using natural rubber latex. The process comprises an accelerator composition at the pre-cure stage comprising a dithiocarbamate, a thiazole and a guanidine compound. In a preferred embodiment, the accelerator composition comprises zinc diethyldithiocarbamate (ZDEC), zinc 2-mercaptobenzothiazole (ZMBT) and diphenyl guanidine (DPG), in conjunction with a stabilizer, such as sodium caseinate. The invention also includes an elastomeric polyisoprene product made by the process, such as a surgeon's glove.

10 Claims, No Drawings

POLYISOPRENE ARTICLES AND PROCESS FOR MAKING THE SAME

RELATED APPLICATION DATA

This application is based on U.S. provisional patent application Ser. No. 60/275,087 filed on Mar. 12, 2001.

FIELD OF THE INVENTION

The invention relates to the field of elastomeric articles used in the medical field. In particular, the invention relates to improvements to the process of making elastomeric polyisoprene articles for medical applications.

BACKGROUND OF THE INVENTION

The manufacturing process for producing elastomeric articles from natural or synthetic rubber latex involves a curing step during which cross-linking or vulcanization through sulfur groups occurs between the polymer units. Conventional processes for making elastomeric articles from natural or synthetic latex typically involve preparing a latex dispersion or emulsion, dipping a former in the shape of the article to be manufactured into the latex and curing the latex while on the former. Desirable properties of certain elastomeric articles such as tensile strength are substantially affected by the cross-linking and curing stages of the manufacturing process.

The use of vulcanizing or sulfur cross-linking accelerator compounds in the manufacture of rubber articles is well-known. Conventional vulcanization accelerators include dithiocarbamates, thiazoles, guanidines, thioureas, amines, disulfides, thiurams, xanthates and sulfenamides. The use of vulcanization accelerators in the manufacture of polyisoprene rubber is disclosed in D'Sidocky et al., U.S. Pat. No. 5,744,552 and Rauchfuss et al., U.S. Pat. No. 6,114,469. Certain fields in which elastomeric articles are needed, such as the medical field, utilize specific types of equipment and processing techniques which accommodate the specific performance and regulatory requirements of the particular article produced.

The use of natural rubber latex in the manufacture of certain articles such as medical gloves has been associated with disadvantageous properties, such as allergic reactions believed by some to be caused by natural proteins or allergens present within the natural rubber latex and the final product. Of increasing interest in the medical field, particularly in the field of gloves, are synthetic elastomeric products and manufacturing processes which altogether reduce, or altogether avoid, the likelihood of potential adverse reactions of the user or wearer.

Synthetic elastomeric polyisoprene articles such as gloves are known and are of interest in the art as an alternative to the use of natural latex. Commercially available synthetic gloves include those elastomers composed of polychloroprene (neoprene), carboxylated acrylonitrile butadiene (nitrile), styrene-isoprene-styrene/styrene-ethylene-butylene-styrene block co-polymers, polyurethane, and polyisoprene. Polyisoprene is one of the most preferred polymers due to its chemical similarity to natural rubber as well as its physical properties such as feel, softness, modulus, elongation and tensile strength. One such polyisoprene glove is commercially available from Maxxim Medical (Clearwater, Fla.).

A majority of glove manufacturing processes are water-based dipping systems. It is known that solvent-based systems are possible for polyisoprene, although such systems are poorly suited for the manufacture and molding of elastomeric articles for medical applications. One difficulty in the field of gloves, for example, is the design of processes and materials which will produce a thin elastomeric article having desirable properties such as high tensile strength. Another disadvantage of solvent-based systems is solvent toxicity. Process and materials which would obviate or reduce the need for the use of toxic solvents while at the same time yielding a product having desirable properties for medical applications are thus still being explored.

Accordingly, there exists a need in the medical device field for improved manufacturing processes for making synthetic elastomeric articles. Especially desirable would be processes which can produce polyisoprene articles, such as surgical gloves, which possess the desirable properties found in the natural rubber counterpart, while at the same time permitting economical and cost-effective manufacturing.

SUMMARY OF THE INVENTION

Applicants have discovered a three-part accelerator composition for sulfur cross-linkable polyisoprene latex which can be used with latex in a process for making elastomeric articles having the desirable properties (e.g., tensile strength) similar to that of natural rubber but without the presence of natural rubber latex proteins and allergens. Another advantage is that the accelerator system is suitable for medical applications where thin molded elastomeric articles are required, such as gloves. Furthermore, the accelerator composition and process of the invention permits the use of a solvent-free, water-based process system, as opposed to a solvent-based process system. The resultant article has properties similar to those produced using the solvent-based system. Accordingly, the use of solvents can be reduced or avoided and solvent toxicity can likewise be avoided using the invention.

Another advantage of the invention is that conventional manufacturing equipment and most readily-available materials can be used in accordance with the invention to make the synthetic polyisoprene glove without the need for new or costly additional materials or equipment. Further, no complicated new process steps are required by the invention and the invention can be readily incorporated into existing glove making processes and systems.

Another aspect of the invention is that the compounded (or ready to use) polyisoprene latex composition formulated in accordance with the invention exhibits prolonged storage stability. For example, the pre-cure storage stability of the compounded polyisoprene latex composition (i.e., the time period prior to the use of the compounded polyisoprene latex composition in the dipping and curing stages) can extend up to about 8 days, in contrast to the typical current 3 to 5 day time period. By extending storage life of the latex, the amount of wasted latex can be significantly reduced and greater flexibility in scheduling manufacturing processes is permitted.

Yet another advantage is that the process of the invention allows for significantly reduced pre-cure process parameters (lower temperature and shorter time periods than conventionally used) and lower dipping temperatures in the manufacturing process. Accordingly, significant cost and resource advantages are provided over conventional manufacturing practices.

The invention provides for a process of making a synthetic elastomeric polyisoprene article comprising the steps of: a) preparing a compounded polyisoprene latex composition containing an accelerator composition containing a dithiocarbamate, a thiazole and a guanidine compound; b) dipping a former into said compounded polyisoprene latex composition; and c) curing said compounded polyisoprene composition on said former. Additionally, the initial pre-cure processing (i.e., prior to storage and article manufacture) can be performed at temperatures of less than 35° C. and in time periods as short as ranging from about 90 minutes (1.5 hours) to about 150 minutes (2.5 hours), preferably about 120 minutes (2.0 hours). The compounded polyisoprene latex composition can be stored for periods up to about 8 days at ambient temperatures (ranging from about 15° C. to about 20° C.). Lower temperatures can be used for the latex dipping step as well.

The invention also provides for a synthetic elastomeric polyisoprene article made by a process comprising the steps of: a) preparing a compounded polyisoprene latex composition comprising an accelerator composition comprising a dithiocarbamate, a thiazole and a guanidine compound; b) pre-curing said compounded polyisoprene latex composition c) dipping a former into said compounded polyisoprene latex composition; and d) curing said compounded polyisoprene composition on said former. Elastomeric articles made by the process of the invention can exhibit tensile strengths of over 3000 psi (as measured in accordance with ASTM D412) even after as much as 7 days of latex storage prior to use in the article manufacturing process.

The invention further provides for a synthetic polyisoprene latex composition comprising:

polyisoprene latex;

a dithiocarbamate compound;

a thiazole compound; and a guanidine compound.

The invention also provides for an accelerator composition for use in making elastomeric polyisoprene articles consisting essentially of:

a dithiocarbamate compound;

a thiazole compound;

a guanidine compound;

wherein the phr (parts per hundred) dry weight ratio of each of the dithiocarbamate; thiazole; and guanidine ranges from about 0.50 to about 1.00 per 100.0 parts polyisoprene.

In a preferred embodiment, the accelerator composition comprises zinc diethyithiocarbamate (ZDEC), zinc 2-mercaptobenzothiazole (ZMBT), and diphenyl guanidine (DPG) and used in conjunction with a stabilizer. Preferably, the stabilizer is an alkali metal caseinate salt, such as sodium caseinate.

DETAILED DESCRIPTION OF THE INVENTION

The accelerator composition of the invention can be used in conjunction with conventional equipment and materials otherwise known to be used in the manufacture of elastomeric articles composed of polyisoprene. In general, the process begins with the preparation of the compounded polyisoprene latex composition. The synthetic polyisoprene latex is combined with the accelerator composition, a stabilizer, and additional ingredients to prepare the polyisoprene latex composition in accordance with the invention. The function of the accelerator is to increase the rate of vulcanization, or the cross-linking of polyisoprene to enhance the curing properties of the latex during the curing stages of the process. Prior to the dipping and curing steps, the compounded latex including the accelerator composition can be used immediately or stored for a period of time prior to its employment in the dipping process.

When the compounded polyisoprene latex composition is ready for use or following storage, a former in the overall shape of the article to be manufactured is first dipped into a coagulant composition to form a coagulant layer directly on the former. Next, the coagulant-coated former is dried and then dipped into the compounded polyisoprene latex composition.

The latex-covered former is then subjected to the curing step. The latex is cured directly onto the former at elevated temperatures thereby producing an article in the shape of the former. Further steps are typically performed as well, such as leaching with water, beading the cuff, and the like. These techniques are well-known in the art. Additional post-treatment processes and techniques steps are often performed as well, such as lubrication and coating, halogenation (e.g., chlorination), and sterilization.

A variety of elastomeric articles can be made in accordance with the invention. Such elastomeric articles include, but are not limited to, medical gloves, condoms, probe covers (e.g., for ultrasonic or transducer probes), dental dams, finger cots, catheters, and the like. As the invention provides numerous advantages and benefits in a number of ways, any form of elastomeric article which can be composed of polyisoprene can benefit from the use of the invention.

Polyisoprene latex is the major component of the pre-cure latex composition. Suitable polyisoprene latex which can be used is readily available and can be obtained from a number of commercial sources, including but not limited to, Kraton™ Corporation, Houston, Tex.; Shell International Corporation, Houston, Tex.; Apex Medical Technologies, Inc. San Diego, Calif.; and Aqualast™ E0501 available from Lord Corporation, Erie, Pa. In addition to polyisoprene, polyisoprene co-polymers and polyisoprene blends can be used as well. Polyisoprene co-polymers which can be used include any co-polymer having an isoprene monomer unit and having sufficiently similar chemical structural and properties of polyisoprene to exhibit the desirable properties of the polyisoprene product when combined with the accelerator composition and made according to the process of the invention. Suitable polyisoprene blends can include, but are not limited to: natural rubber latex; polydiene and its co-polymers, such as polybutadiene; substituted polydiene, such as polychloroprene; thermoplastic materials, such as polyurethane; and the like.

The accelerator composition of the invention comprises at least one dithiocarbamate, at least one thiazole, and at least one guanidine compound. Preferably, the dithiocarbamate compound for use with the invention is zinc diethyldithiocarbamate, also known as ZDEC or ZDC. Suitable ZDEC which can be used includes Bostex™ 561 (commercially available from Akron Dispersions, Akron, Ohio). The preferred thiazole compound for use in the invention is zinc 2-mercaptobenzothiazole, also known as zinc dimercaptobenzothiazole or ZMBT. Suitable ZMBT which can be used includes Bostex™ 482A (commercially available from Akron Dispersions, Akron, Ohio). In a preferred embodiment, the guanidine compound used in the accelerator composition is diphenyl guanidine, also known as DPG. Suitable DPG which can be used includes Bostex™ 417 (commercially available from Akron Dispersions, Akron, Ohio).

Other dithiocarbamate, thiazole and guanidine derivatives can also be use in accordance with the invention, provided each is chemically compatible with, i.e., does not substantially interfere with the functionality of, the remaining two accelerator compounds used. Dithiocarbamate derivatives which can also be used include zinc dimethyldithiocarbamate (ZMD), sodium dimethyldithiocarbamate (SMD), bismuth dimethyldithiocarbamate (BMD), calcium dimethyldithiocarbamate (CAMD), copper dimethyldithiocarbamate (CMD), lead dimethyldithiocarbamate (LMD), selenium dimethyldithiocarbamate (SEMD), sodium diethyldithiocarbamate (SDC), ammonium diethyldithiocarbamate (ADC), copper diethyldithiocarbamate (CDC), lead diethyldithiocarbamate (LDC), selenium diethyldithiocarbamate (SEDC), tellurium diethyldithiocarbamate (TEDC), zinc dibutyldithiocarbamate (ZBUD), sodium dibutyldithiocarbamate (SBUD), dibutyl ammonium dibutyldithiocarbamate (DBUD), zinc dibenzyldithiocarbamate (ZBD), zinc methylphenyl dithiocarbamate (ZMPD), zinc ethylphenyl dithiocarbamate (ZEPD), zinc pentamethylene dithiocarbamate (ZPD), calcium pentamethylene dithiocarbamate (CDPD), lead pentamethylene dithiocarbamate (LPD), sodium pentamethylene dithiocarbamate (SPD), piperidine pentamethylene dithiocarbamate (PPD), and zinc lopetidene dithiocarbamate (ZLD).

Other thiazole derivatives which can be used include 2-mercaptobenzothiazole (MBT), copper dimercaptobenzothiazole (CMBT), benzothiazyl disulphide (MBTS), and 2-(2',4'-dinitrophenylthio) benzothiazole (DMBT).

Other guanidine derivatives which can be used include diphenyl guanidine acetate (DPGA), diphenyl guanidine oxalate (DPGO), diphenyl guanidine phthalate (DPGP), di-o-tolyl guanidine (DOTG), phenyl-o-tolyl guanidine (POTG), and triphenyl guanidine (TPG).

The proportions and ratios of the ingredients of the accelerator composition can vary somewhat provided all three of the ingredients, i.e., dithiocarbamate, thiazole and guanidine compounds, are present. With respect to the preferred accelerator ingredients, each of the accelerator compounds zinc diethyldithiocarbamate (ZDEC), zinc 2-mercaptobenzothiazole (ZMBT) and diphenyl guanidine (DPG) can be present in an individual amount ranging from about 0.50 phr (parts by weight per 100 parts by weight of rubber) to about 1.00 phr dry weight per 100 parts polyisoprene. In other words, the accelerator compositions of the invention comprise ZDEC:ZMBT:DPG phr dry weight ratios ranging respectively from about 0.50:0.50:0.50 phr to about 1.00:1.00:1.00 phr.

In a preferred embodiment, a stabilizer is used in conjunction with the accelerator composition. Any stabilizer known in the art useful in curable latex systems can be used provided it is chemically compatible with the other ingredients and provides the desired function, i.e., prolongs stabilization of the pre-cure compounded polyisoprene latex. A variety of stabilizers can be used, including but not limited to, milk protein salts, anionic surfactants such as sodium lauryl sulfates, and sorbitan fatty acid esters.

Milk protein salts are preferred for use as the stabilizer. In particular, alkali metal caseinate salts are preferred. Alkali metal caseinate salts which can be used in accordance with the invention include, but are not limited to, sodium caseinate, potassium caseinate, manganese caseinate and zinc caseinate, and combinations thereof. Most preferred for use as the stabilizer is sodium caseinate (commercially available from Technical Industries, Inc., Peacedale, R.I.).

Anionic surfactants which can be used as stabilizers for the invention include Rhodopex® ES (a composition having a sodium lauryl (3) sulfate active available from Rhodia, Cranbury, N.J.) and Rhodacal® DS-10 (a composition having a branched sodium dodecylbenzene active available from Rhodia, Cranbury, N.J.). Sorbitan fatty acid ester surfactants which can be used as stabilizers in the invention include polyoxyethylene sorbitan fatty acid esters such as Tween® 80 (a polysorbate available from ICI Americas, Inc., Wilmington, Del.).

The amount of stabilizer present in the pre-cure polyisoprene latex composition is preferably ranges from about 0.50 phr dry weight to about 1.00 phr dry weight (per 100.00 parts dry weight polyisoprene). Preferably, the amount of stabilizer is present in an amount of about 0.75 phr dry weight.

In addition to the polyisoprene, accelerator composition and stabilizer, additional ingredients which enhance or facilitate the manufacturing process can be included in the compounded polyisoprene latex composition as well. The compounded polyisoprene latex composition can also include catalysts (or accelerator initiators) such as alkali earth metal oxides and methyl oxides, preferably zinc oxide (ZnO) (commercially available from Maxxim Medical, Eaton, Ohio); curing (or cross-linking) agents such as elemental Sulfur (e.g., Bostex™ 378 commercially available from Akron Dispersion, Akron, Ohio), organic sulfides or other sulfur donor compounds; and anti-oxidants, such as Wingstay™ (e.g., butylated reaction product of p-cresol and dicyclopentadiene (DCPD) such as Bostex™ 24 available from Akron Dispersion, Akron, Ohio).

Preparation of Polyisoprene Latex Composition

The compounded polyisoprene latex composition in accordance with the invention can be prepared using the following general procedure:

Polyisoprene latex (typically 60% solids) and the stabilizer (e.g., sodium caseinate) are combined at ambient temperature (about 20° to about 25° C.). After mixing for a period of time, the mixture is then diluted to 40% solids in water. Wingstay L is then added and the mixture is stirred for approximately 15 minutes. At this point, the pH can be adjusted to a range of about 8.5 to 9.0. Zinc oxide is added, followed by the sulfur and accelerator compounds. Preferred accelerator compounds are ZDEC, ZMBT and DPG and are added in ratios ranging from 0.50:0.50:0.50 phr to 1.00:1.00:1.00 phr dry weight per 100.0 parts polyisoprene. The mixture is then heated to a temperature within a range of about 20° C. to about 40° C., preferably from about 25° C. to about 30° C., while continuously stirring for a time period ranging from about 1.5 hours to about 2.5 hours, preferably about 2 hours, using a magnetic stirrer and heating plate.

The mixture is then cooled to a temperature ranging of less than about 25° C., typically ranging from about 15° C. to about 20° C. The compounded latex is preferably stored at ambient temperatures ranging from about 15° to about 20° C. At these temperatures, the compounded polyisoprene latex composition can be stored for periods lasting up to about 8 days prior to its use in the dipping and curing process.

Preparation of a Polyisoprene Glove

Initially, the pH of the compounded polyisoprene latex can be adjusted to a pH of approximately 10. A glove former is pre-heated in an oven to a temperature of about 70° C. and then dipped in a pre-prepared coagulant composition at a temperature of about 55° C. for a period of time and then removed therefrom. Next, the coagulant-coated former is placed in a drying oven at 70° C. for a time sufficient to dry the coagulant, typically about 5 minutes.

The coagulant-coated former is removed from the oven and dipped into the compounded polyisoprene latex at ambient temperature, or a temperature ranging from about 20° C. to about 25° C. The coated former is removed and placed in oven at a temperature of about 70° C. for about 1 minute. The glove and former are removed from oven and placed into water leaching tank having a temperature of about 65° C. for about 5 minutes. The glove and former are removed from the leaching tank and placed dried at about 70° C. for a period sufficient to dry the glove, typically about 5 minutes. This is the end of the first curing stage.

At the second curing stage, the glove and former are placed in an oven heated to a temperature of about 120° C. for about 20 minutes. The glove and former are removed and cooled to ambient temperature. Finally, the glove is stripped from the former.

The gloves can be further treated in accordance with the particular needs, such as using lubrication, coating, halogenation, and sterilization techniques, all of which are conventional. Other conventional steps can be incorporated into the general process as well.

When prepared in accordance with the invention, elastomeric articles such as gloves exhibit the following physical properties: tensile strength of greater than about 3000 psi, elongation of greater than about 750% at break, and a tensile modulus of less than about 300 psi at 300% elongation as measured in accordance with ASTM D412.

Other elastomeric polyisoprene articles can be prepared using processes similar to those described herein, in combination with conventional equipment and techniques readily available in the art. For example, an elastomeric article in the form of condom can be prepared using a condom former.

The following example further illustrates the advantages of the invention and should not be construed as limiting the invention to the embodiments depicted therein.

EXAMPLES

Example 1

Preparation of a Polyisoprene Glove

Polyisoprene latex (Kraton™ IR PR401 lot # 000313 having TSC 64.40% obtained from Shell International Corporation, Houston, Tex.) was diluted with water. Sodium caseinate (obtained from Technical Industries, Inc., Peacedale, R.I.) was then added to the mixture and stirred at ambient temperature. While under continuous stirring, zinc oxide and sulfur dispersions were added to the mixture. Accelerator compounds ZDEC (from Akron Dispersions, Akron Ohio), ZMBT, and DPG (from Akron Dispersions, Akron, Ohio) were formulated into dispersions and then added. Wingstay™ L was added and the mixture was stirred for approximately 15 minutes. The composition was diluted to about 37.0% solids with water. The pH was adjusted using ammonium hydroxide to pH 10.7. The composition was maintained at a temperature of 25° C. and stored under continuous agitation for 24 hours at a temperature of less than 25° C.

Accordingly, the following is a summary of the formulation ingredients and their respective amounts. All percentages are percentages by weight unless otherwise noted.

| Latex Formulation: | |
|---|---|
| Ingredient | Parts (phr) dry weight |
| Polyisoprene | 100.00 |
| ZDEC | 0.50 |
| ZMBT | 0.50 |
| DPG | 1.00 |
| Sodium caseinate | 0.75 |
| ZnO | 0.50 |
| Sulfur | 1.25 |
| Wingstay ™ L | 2.00 |

A glove former was preheated to 100° C. in an oven, removed and dipped into a coagulant composed of soft water 80.65%, calcium nitrate 13.65%, calcium carbonate 5.46%, wetting agent (Surfonyl™ TG 0.2%), cellulose (Cellosize™ QP 52000) 0.04%) at a temperature of 56° C. for a period of 30 seconds and removed. The coagulant-coated former was cooled to a temperature of about 58° C. and was placed in a drying oven at a temperature of 100° C. for a period of time sufficient to dry the coagulant.

The coagulant-coated former was removed from the oven and dipped into the compounded polyisoprene latex composition of Formula 1 at a temperature of 25° C. for a period of 0.8 minutes. The coated former was removed and placed into a pre-heated oven at a temperature of 130° C. for a period of 0.8 minutes.

The coated former was then removed from the oven and placed into water leaching tank at a temperature of 50° C. for a period of 5.0 minutes. The former was removed from the leaching tank and placed into an oven at a temperature of 70° C. for 30 seconds.

The former was removed from the oven and dipped into a silicone tank at a temperature of 40° C. for 30 seconds. The former was removed from the silicon tank and while still on the former, the glove was beaded at the cuff using a beader roller.

The former were then placed into a second stage cure oven and moved therethrough at zone temperatures ranging from 110° C. to 135° C. for a total time period lasting for a period of 9.5 minutes. After exiting the curing oven, the glove was subjected to a post-cure leaching. At this step, the glove on the former was rinsed with water at a temperature of 70° C. water for a period of about 1 minute.

The glove was placed in a slurry tank at a temperature of 55° C. for 30 seconds. The slurry composition contained 85.2% water, 14.33% starch, 0.4% cellulose (Cellosize™ QP 52000), 0.4% sodium hypochlorite, 0.01% surfactant (Darvan™), and 0.02% Casastab™ T. The formers were then placed into a post-slurry oven to dry the glove thereby producing the final glove. The glove covered former was cooled and the glove was stripped therefrom.

The physical properties of the glove produced by the above process were evaluated. Samples were obtained from the gloves exhibited average tensile strength values of 3810 psi, tensile modulus value of 171 psi at 300% elongation, and 1125% elongation at break as measured using ASTM D142.

Example 2

Comparative Data using Different Accelerator Formulations and Process Conditions Differing compounded polyisoprene latex compositions and varying process parameters were used to prepare samples, the physical properties of which were then tested and evaluated. Compounded latex containing various accelerator compounds and phr (parts per hundred) ratios were prepared in accordance with a process similar to that of Example 1 Process for Preparation of Polyisoprene Latex Composition", and pre-cured and stored at the corresponding temperatures and conditions described or listed in Table 1 below.

Test samples were prepared from compounded latex formulations at various intervals over a total latex storage period of eight (8) days. Each of samples 1 and 3 through 16 were then prepared by heating plates to a temperature of about 70° C. for a period of about 5 minutes, and subsequently dipping the plates in coagulant (35% calcium nitrate, 7% calcium carbonate, 0.03% Surfonyl™ TG) at a temperature of about 55° C. for a period of about 10 seconds. The coagulant coated plates were then dried at 70° C. for a period of about 5 minutes. The coated plates were then dipped into the compounded polyisoprene compositions, which were stored and dipped at the corresponding temperature shown in Table 1. The plates were leached with water at a temperature of about 65° C. for a period of about 3 minutes, and subsequently dried at a temperature of about 70° C. for a period of about 5 minutes. The plates were then cured at a temperature of 120° C. for a period of about 20 minutes. The samples were then stripped from the plates.

Samples 2a and 2b were prepared using slightly different process parameters and were obtained from articles prepared using manufacturing-scale parameters and equipment. For each of samples 2a and 2b, a mold (glove former) was heated to a temperature of about 55° C. and dipped in coagulant (same coagulant as above) at a temperature of about 55° C. The coagulant-covered mold was then dried in an oven at a temperature of about 70° C. for a period of about 3 minutes. The dried coagulant-coated mold was removed from the oven and dipped into the compounded latex composition for a period of about 12 seconds dwelling time, removed for a period of about 6 seconds unsubmerged, and then redipped for a further 8 seconds. The latex-coated mold was leached at temperature of about 50° C. for a period of about 5 minutes, and subsequently cured at a temperature of about 135° C. for a period of about 15 minutes.

The following Table I is a summary of the process parameters and compounded latex formulations prepared:

TABLE 1

Accelerator and Stabilizer Formulations and Process Conditions

| Sample No. | Accelerator Composition (ZDEC/ZMBT/DPG Pbr ratio) | Stablizer (type/phr) | Storage/Dipping |
|---|---|---|---|
| Sample 1 | 1.0/1.0/0.50 | Na Caseinate/0.75 | ambient/ambient |
| Sample 2a | 0.50/1.0/1.0 | Na Caseinate/0.75 | 20–25° C./ambient |
| Sample 2b | 0.50/0.50/1.0 | Na Caseinate/0.75 | 20–25° C./ambient |
| Sample 3 | 1.0/1.0/0.50 | Na Caseinate/0.75 | 16–18° C./ambient |
| Sample 4* | 1.9/0/0.50 | Na Caseinate/0.75 | ambient/ambient |
| Sample 5 | 0/2.1/0.50 | Na Caseinate/0.75 | ambient/ambient |
| Sample 6 | 1.0/1.0/0 | Na Caseinate/0.75 | ambient/ambient |
| Sample 7 | 1.9/0/0 | Na Caseinate/0.75 | ambient/ambient |
| Sample 8 | 1.0/0.50/0.25 | Na Caseinate/0.75 | ambient/ambient |
| Sample 9 | 1.0/1.0/0.50 | DS10/0.75 | ambient/ambient |
| Sample 10 | 1.0/1.0/0.50 | ES/0.3 | ambient/ambient |
| Sample 11 | 1.0/1.0/0.50 | Tween ® 80/0.75 | ambient/ambient |
| Sample 12** | 1.0/1.0/0.50 | Na Caseinate/0.75 | ambient/ambient |
| Sample 13*** | 1.0/1.0/0.50 | Na Caseinate/0.75 | ambient/ambient |
| Sample 14**** | 1.0/1.0/0.50 | Na Caseinate/0.75 | ambient/ambient |
| Sample 15 | 1.0/1.0/0.50 | Na Caseinate/0.75 | 16–18° C./ambient |
| Sample 16 | 1.0/1.0/0.50 | Na Caseinate/0.75 | 16–18° C./ambient |

*Sample 4 compounded latex exhibited about 4% coagulation indicating significant precipitation of solids out of the formulation.
**The precure temperature for Sample 12 was ambient temperature (20° C.).
***The precure time for Sample 13 was a period of about 2.5 hours (150 minutes).
****The precure time for Sample 14 was a period of about 1 hour (60 minutes).

DSIO refers to Rhodacal® DS-10 which comprises sodium dodecylbenzene (branched) sulfonate available from Rhone-Poulene, Inc., Dayton, N.J. ES refers to Rhodapex ES which comprises sodium lauryl (3) sulfate available from Rhone-Poulenc, Inc., Dayton, N.J. Tween® 80 comprises polysorbate 80 and polyoxyethylene (20) sorbitan monooleate available from ICI Americasw, Inc. (Wilmington, Del.). Unless indicated otherwise, "ambient" temperature was measured as approximately 20° C. Precure temperature and time for each of Samples 1 through 11 was a temperature of 30° C. for a period of approximately 2 hours (120 minutes).

Each of the samples was then evaluated for tensile strength in accordance with ASTM D 412-98a "Standard Test Methods for Vulcanized Rubber and Thermoplastic Elastomers—Tension" (1998) with no exceptions using an Instron® testing apparatus. The average tensile strength values for each sample were calculated from averaging five individual samples per day storage value. The average tensile strength values for each of the samples tested are summarized in the following Table 2:

TABLE 2

Tensile Strength Corresponding to Differing Latex Storage Periods

| Sample # | Tensile Strength (psi) @ Compounded Latex Storage Time | | | | | | | | |
|---|---|---|---|---|---|---|---|---|---|
| | Day 0 | Day 1 | Day 2 | Day 3 | Day 4 | Day 5 | Day 6 | Day 7 | Day 8 |
| 1 | 2698 | 3648 | 3398 | 3080 | — | 2651 | 2548 | — | 2410 |
| 2a | — | 3768 | 3640 | 3839 | — | — | 3441 | 3541 | — |
| 2b | — | 3498 | 3782 | 3882 | — | — | 3939 | 3043 | — |
| 3 | 2201 | 2413 | 3192 | 3158 | 3288 | 3154 | 3008 | 3000 | 2909 |
| 4 | 3242 | 3609 | — | 3515 | 3244 | 3096 | 2498 | — | 2464 |
| 5 | 1483 | 1733 | — | 2149 | 1590 | 1534 | 1478 | — | 1358 |
| 6 | No tensile measured/sample did not break | | | | | | | | |
| 7 | No tensile measured/sample did not break | | | | | | | | |
| 8 | 1018 | 1063 | 3051 | — | 2177 | — | — | 1802 | — |
| 9 | — | 2566 | 914 | 2843 | — | — | — | — | — |
| 10 | — | 1278 | 2520 | 839 | — | — | — | — | — |
| 11 | — | 2407 | 2901 | 3042 | 2834 | — | — | — | — |
| 12 | — | 2450 | — | — | — | 2374 | — | 2212 | — |
| 13 | 2544 | 3213 | 3181 | 2974 | 2770 | — | 2393 | — | — |
| 14 | 1595 | 2221 | 2838 | — | 2383 | — | — | 1805 | — |
| 15 | 2084 | 2974 | 2452 | 3497 | 3312 | 3075 | 3056 | 2979 | 2968 |
| 16 | 2194 | 2904 | 3064 | 3110 | 3170 | 3002 | 2885 | 2902 | 2746 |

As can be seen from the above data, synthetic elastomeric polyisoprene samples prepared in accordance with the invention can exhibit significantly elevated tensile strengths of about 3000 psi, even after using compounded latex which has been stored for periods of at least 5 days and lasting up to about seven (7) days. In general, the best tensile strength values per day latex storage were obtained using the combination of the three preferred accelerator compounds (ZDEC/ZMBT/DPG) and preferred phr ratios (0.50 to 1.00/0.50 to 1.00/0.50 to 1.00 phr), as well as the preferred stabilizer, sodium caseinate. Samples prepared without one of the three preferred accelerator compounds exhibited significantly lower tensile strength values, as can be seen from Samples 4, 5, 6 and 7. Based on the results of testing of samples 6 and 7, the tensile strength values for these samples failed to meet minimum FDA regulatory standards required for elastomeric materials to be used for surgeon's gloves, which is set at about 2479 psi.

Samples 3, 15 and 16 were prepared from compounded latex comprising the preferred accelerator composition ZDEC/ZMBT/DPG in a 1.0/1.0/0.50 phr ratio, with sodium caseinate as the stabilizer, and stored at temperatures ranging from about 16° C. to about 18° C. as seen in Table 1. As can be seen from Table 2, these samples exhibited the highest combination of storage longevity in relation to high tensile strength values.

Sample 4, which was prepared from an accelerator composition without the thiazole compound, demonstrated high tensile strength values. This compounded latex, however, exhibited an undesirable amount of precipitation of solids out of the composition.

Based on the tensile data that was compiled for samples 9, 10 and 11, the use of stabilizers in the compounded latex other than preferred stabilizer sodium caseinate resulted in samples with significantly reduced tensile strength per given storage period when compared to samples 1 through 3 and 15 and 16, for example.

Samples 12, 13 and 14 were prepared from latex compositions under varying pre-cure time and temperature parameters. As can be seen from Table 2, deviations in pre-cure temperature and time conditions can also significantly effect the physical properties of the resulting material as well.

Industrial Applicability

The invention is useful in manufacturing process for elastomeric articles composed of polyisoprene. The invention affords the ability to produce synthetic polyisoprene articles which closely mimic the physical properties of elastomeric articles made from natural rubber latex. The invention can be advantageously incorporated into the manufacturing of surgical gloves, condoms, probe covers, dental dams, finger cots, catheters, and the like.

The invention has been described with reference to various specific and preferred embodiments and techniques. However, it should be understood that many variations and modifications can be made while remaining within the spirit or scope of the invention as defined by the claims set forth below.

What is claimed is:

1. A process of making an elastomeric polyisoprene article comprising the steps of:
    a) preparing a compounded latex composition containing an accelerator composition and a stabilizer, said accelerator composition comprising a dithiocarbamate, a thiazole and a guanidine compound;
    b) dipping a former into said compounded latex composition; and
    c) curing said compounded latex composition on said former to form said elastomeric polyisoprene article.

2. The process of claim 1, wherein said elastomeric polyisoprene article is a glove.

3. The process of claim 1, wherein said elastomeric polyisoprene article is a condom.

4. The process of claim 1, wherein said elastomeric polyisoprene article is a probe cover.

5. The process of claim 1, wherein said elastomeric polyisoprene article is a catheter.

6. The process of claim 1, wherein said accelerator composition comprises:
    zinc diethyldithiocarbamate;
    zinc 2-mercaptobenzothiazole; and
    diphenyl guanidine.

7. The process of claim 1, wherein said stabilizer comprises a milk protein salt.

8. The process of claim 7, wherein said stabilizer comprises sodium caseinate.

9. The process of claim 1, wherein said accelerator composition comprises:

a dithiocarbamate to thiazole to guanidine phr ratio of from about 0.50 phr to about 1.00 phr dithiocarbamate, from about 0.50 phr to about 1.00 phr thiazole, from about 0.50 phr to about 1.00 phr guanidine, per 100.0 phr polyisoprene of the compounded latex composition.

10. An accelerator composition for use in a process for making elastomeric polyisoprene articles, said accelerator composition consisting essentially of:

a dithiocarbamate compound;

a thiazole compound; and a guanidine compound;

wherein the phr dry weight ratio of each of the dithiocarbamate, thiazole and guanidine ranges from about 0.50 to about 1.00 per 100.0 parts polyisoprene.

\* \* \* \* \*